United States Patent
Thuerk

(10) Patent No.: US 7,647,378 B2
(45) Date of Patent: Jan. 12, 2010

(54) PERSONNEL SEARCH ENHANCEMENT FOR COLLABORATIVE COMPUTING

(75) Inventor: Keith A. Thuerk, Southlake, TX (US)

(73) Assignee: International Business Machines Corporation, Armonk, NY (US)

( * ) Notice: Subject to any disclaimer, the term of this patent is extended or adjusted under 35 U.S.C. 154(b) by 917 days.

(21) Appl. No.: 10/715,313

(22) Filed: Nov. 17, 2003

(65) Prior Publication Data

US 2005/0108207 A1 May 19, 2005

(51) Int. Cl.
*G06F 15/16* (2006.01)
(52) U.S. Cl. ...................................................... 709/206
(58) Field of Classification Search ................. 709/206; 715/752, 753, 758, 759
See application file for complete search history.

(56) References Cited

U.S. PATENT DOCUMENTS

| | | | |
|---|---|---|---|
| 5,778,357 | A | 7/1998 | Kolton et al. |
| 6,108,686 | A | 8/2000 | Williams, Jr. |
| 6,192,362 | B1 | 2/2001 | Schneck et al. |
| 6,266,663 | B1 | 7/2001 | Fuh et al. |
| 6,266,668 | B1 | 7/2001 | Vanderveldt et al. |
| 2002/0032735 | A1 | 3/2002 | Burnstein et al. |
| 2002/0032772 | A1 | 3/2002 | Olstad et al. |
| 2002/0049704 | A1 | 4/2002 | Vanderveldt et al. |
| 2002/0075303 | A1* | 6/2002 | Thompson et al. ........... 345/751 |
| 2002/0075305 | A1* | 6/2002 | Beaton et al. ................ 345/751 |
| 2004/0064693 | A1* | 4/2004 | Pabla et al. .................. 713/168 |
| 2004/0267887 | A1* | 12/2004 | Berger et al. ................ 709/206 |

OTHER PUBLICATIONS

Landon, Deb, Del Valle, Sergio, Piza, Jazmin, Rush, Leif, "Deploying Lotus Sametime on the IBM eserver iSeries Server", IBM redbooks, Jun. 2002.*
Coleman, David, Ward, Lewis, "Taking Advantage of Real-Time Collaboration Tools", IT Pro, Jul. / Aug. 1999.*
Cherry, Steven, "IM Means Business", IEEE Spectrum, Nov. 2002.*
Moore, Cathleen, "Predicting the Future of Instant Messaging", InfoWorld.com, Sep. 10, 2002.*
Cherry, S.M., "IM means business", Spectrum, IEEE vol. 39, Issue 11, Nov. 2002 pp. 28-32.*
Donath, J.S., "Casual collaboration [visual interface]", Multimedia Computing and Systems, 1994., Proceedings of the International Conference on May 15-19, 1994 pp. 490-495.*
Landon et al., "Deploying Lotus Sametime on the IBM eserver iSeries Server", Redbooks, IBM Internaltionl Techchnical Support Organization, Jun. 2002.*

(Continued)

*Primary Examiner*—Vivek Srivastava
*Assistant Examiner*—William J Goodchild
(74) *Attorney, Agent, or Firm*—Novak Druce + Quigg LLP

(57) ABSTRACT

A collaborative computing method can include the step of providing a collaborative computing system that includes at least one instant messaging client. The instant messaging client can be initialized within a graphical user interface. A search initializing action can be performed within the graphical user interface. A search view can be presented responsive to the search initiating action. A search pattern can be specified within the search view. A search result can be displayed within the search view, wherein the search result can include at least one online entity, such as a user and/or group.

12 Claims, 4 Drawing Sheets

OTHER PUBLICATIONS

Hardy, D.R., et al., "Customized Information Extraction as a Basis for Resource Discovery", Univ. of Co, Mar. 1994.

Kerschberg, L., et al., "A Semantic Taxonomy-Based Personalizable Meta-Search Agent", Proc. of Int'l. Conf. on Web Info. Systems Eng., pp. 41-50, Dec. 3-6, 2001.

Pohs, W., et al., "The Lotus Knowledge Discovery System: Tools and Experiences", IBM Systems Journal, vol. 40, No. 4, pp. 956-966, 2001.

Tan, A., et al., "Adding Personality to Information Clustering", Proc. of 6th Pacific-Asia Conf., PAKDD 2002, pp. 251-256, May 6-8, 2002.

\* cited by examiner

PERSONNEL SEARCH ENHANCEMENT FOR COLLABORATIVE COMPUTING

BACKGROUND

1. Field of the Invention

The present invention relates to the field of computer software and, more particularly, to collaboration software.

2. Description of the Related Art

Collaboration software is software that permits people to exchange ideas and work products in real-time from geographically disperse locations. Collaboration software components can include Web conferencing, video and telephony teleconferencing, instant messaging, chatting, co-browsing, and the like. Effective use of collaboration software can result in substantial time and cost savings because collaboration software can result in effective communications among individuals without requiring the individuals to be located in the same physical location. Communication conducted utilizing collaboration software can be referred to as software-enhanced communication.

At present, conventionally implemented collaboration software lacks the robustness to substitute for interpersonal interactions that occur between geographically proximate people, especially in regards to informal interactions. Informal interactions can refer to interpersonal contacts between people that are conducted without extensive preparation or planning, such as interactions where two or three colleagues exchange ideas in passing. A number of informal interactions are quick affairs, which may involve only a few minutes of time. Informal interactions are made possible through presence awareness inherent whenever individuals are proximately located to each other.

Presence awareness refers to knowing whether an individual is available for communication in a network. When individuals are geographically close, their proximity will afford numerous opportunities for quick communications. For example, interpersonal communications often occur around a coffee machine, during a lunch break, in a hallway, within a smoking area, and the like. Traditionally, collaboration software includes few, if any, features to provide geographically disperse individuals with presence awareness capabilities. Accordingly, coordination overhead for arranging software-enhanced communication can result in an overhead barrier that prevents collaboration software from providing interactions that substitute for proximate interactions. Further, as the number of people involved in a communication session increases, the coordination overhead for establishing software-enhanced communications can increase significantly.

One notable exception to the presence awareness shortcoming of conventional collaboration software is the LOTUS SAMETIME™ application produced by International Business Machines, Inc. (IBM) of Armonk, N.Y. The LOTUS SAMETIME™ application integrates a multitude of collaborative software components together, including instant messaging components, chat components, Web conferencing components, co-browsing components, e-mail components, and the like. The instant messaging component of LOTUS SAMETIME™ application can provide a degree of presence awareness, as all online users can be registered with an instant messaging service. This presence awareness is indicated through the presentation of currently online users within an instant messaging graphical user interface (GUI). The integrated nature of LOTUS SAMETIME™ application permits any of a variety of software-enhanced communications that include instant messaging as well as Web conferencing, chatting, co-browsing, and the like to be initiated from the instant messaging GUI.

The presence awareness capabilities of LOTUS SAMETIME™ application, however, are limited by the manner in which online users are presented within the instant messaging GUI. At present, online individuals registered for instant messaging communications appear within the instant messaging GUI in a haphazard fashion. That is, online users are not presented alphabetically or in a manner which is easily searchable by a user. This shortcoming has generally not been noticed, as typical instant messaging GUIs only display a limited number of registered contacts, i.e. those that have a point of presence. As this number grows, however, the usefulness of the inherent presence awareness capabilities provided within instant messaging GUIs diminishes since online users become increasingly difficult to locate within the GUI. This is especially true in situations involving potentially vast numbers of people, such as the people contained within a large organization, customer base, and/or large scale project. Consequently, the presence awareness capability of LOTUS SAMETIME™ application does not inherently result in usable, large scale presence awareness capabilities that can be applied to large organizations. At present, no other conventional collaboration software or software application extension includes presence awareness capabilities that can be used to enable user friendly, software-enhanced communications between people within a large organization.

SUMMARY OF THE INVENTION

The present invention provides a method, a system, and an apparatus for enhancing collaborative computing with customizable personnel searches. More specifically, collaborative software can include presence awareness features that indicate which users and/or user groups are online. The presence awareness features can be implemented via an availability list somewhat analogous to the instant messaging graphical user interface (GUI) of many conventional instant messaging applications. The GUI displaying the availability list can permit a user to input a customized search pattern to locate one or more online entities, where an online entity can include a user and/or a group. A search can be performed against one or more record sources, such as a company intranet directory, a personal contact directory, and the like. A search result containing the online entities satisfying the search pattern can be responsively obtained. Further, the search results can be displayed to the user so that the user can directly initialize any variety of software-enhanced communication between the user and an online entity included in the search results.

Unlike most conventional instant messaging GUIs that limit communications from the instant messaging GUI to instant messaging type communications, any of a variety of software-enhanced communications can be initiated from the presence awareness list provided by the present invention. This capability is especially advantageous for establishing multiparty software enhanced communication sessions, which cannot be directly established from conventional collaboration software other than LOTUS SAMETIME™ type applications. Conventional LOTUS SAMETIME™ type applications, however, lack the online entity search capability of the present invention. As used herein, a LOTUS SAMETIME™ type application can include software products within the LOTUS SAMETIME™ family of products that integrate presence awareness into a collaboration software package, other collaboration software packages that can be forward and/or backward compatible with the LOTUS SAMETIME™ family of products, and any other collaboration software packages having the presence awareness capabilities disclosed herein.

One aspect of the present invention includes a collaborative computing method. The method can include the step of providing a collaborative computing system that includes at least one instant messaging client, such as a LOTUS SAMETIME™ type software system. The instant messaging client can be initialized from within a GUI. A search initializing action can be performed within the GUI resulting in the presentation of a search view, which can be used to specify a search pattern for online entities. A search can be performed based upon this user-specified search pattern and a search result can be obtained. The search result can be displayed within the search view. At least one software-enhanced communication involving one or more online entities and the user of the GUI can be directly executed from the search result.

In one embodiment, the search initializing action can comprise at most two user inputs. For example, the search initializing action can include the step of selecting a menu option from within the instant messaging GUI that initializes the search view. When the collaboration software is a LOTUS SAMETIME™ type system, the menu option can be a submenu of the "People" and/or "Options" menu. In another example, the search initializing action can include selecting a previously designated keyboard combination sometimes called a hot-key combination to initialize the search view.

In another embodiment, a multitude of user specific search patterns can be established. The search patterns can be recorded in a memory space. Once a search pattern is stored, it can be utilized by an authorized user when that user performs online entity searches. In yet another embodiment, the step of specifying the search for online entities can include the step of specifying multiple record sources upon which a search can be conducted. The GUI can be utilized by a user to establish an order in which the collaboration software searches the record sources.

Another aspect of the present invention can include a method for establishing software-enhanced communications. The method can automatically detect multiple online entities having access to a collaboration software application. The online entities can be users and/or groups. In one embodiment, the collaboration software application can be a LOTUS SAMETIME™ type application. A GUI can be displayed for an instant messaging component of the collaboration software application. The GUI can provide a user selectable search option that can be initialized by a GUI user. When a user selects the search option, search input fields can be presented within the GUI. A user can input data into the search input fields resulting in a search pattern being established.

The search pattern can be applied to users having a point of presence. A list of the online entities which satisfy the search pattern can be presented to the user. The user can then select one of the entities from the list. In response, the collaboration software application can establish a software-enhanced communication session between the user and the selected online entity. The software-enhanced communication session can include a type of communication other than instant messaging. For example, the software enhanced communication session can include a chat session, a Web conferencing session, a video teleconferencing session, a co-browsing session, and the like.

Yet another aspect of the present invention can include a collaboration software system. The collation software system can include a collaboration server and at least one client side collaboration application. The collaboration server can coordinate collaboration operations between a multitude of geographically disperse software components. The client side collaboration application can include a search engine and a GUI. The search engine can query the collaboration software system for online entities. The queries of the search engine can utilize local record sources and local definitions as well as remote record sources and definitions communicatively accessible via a network.

The GUI can permit authorized users to customize settings of the search engine. In one embodiment, customized search limitations can be established for the search engine, where search results for a particular user can be limited to those online entities, which satisfy the search limitations established for that user. For example, a search limitation can prevent all users of the collaboration software system who are not within a designated team or division from receiving information pertaining to a specified online entity. In a particular embodiment, the GUI can include an instant messenger view and a search view, where the search view can be directly initiated from the instant messenger view. The search view can also utilize the search engine.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
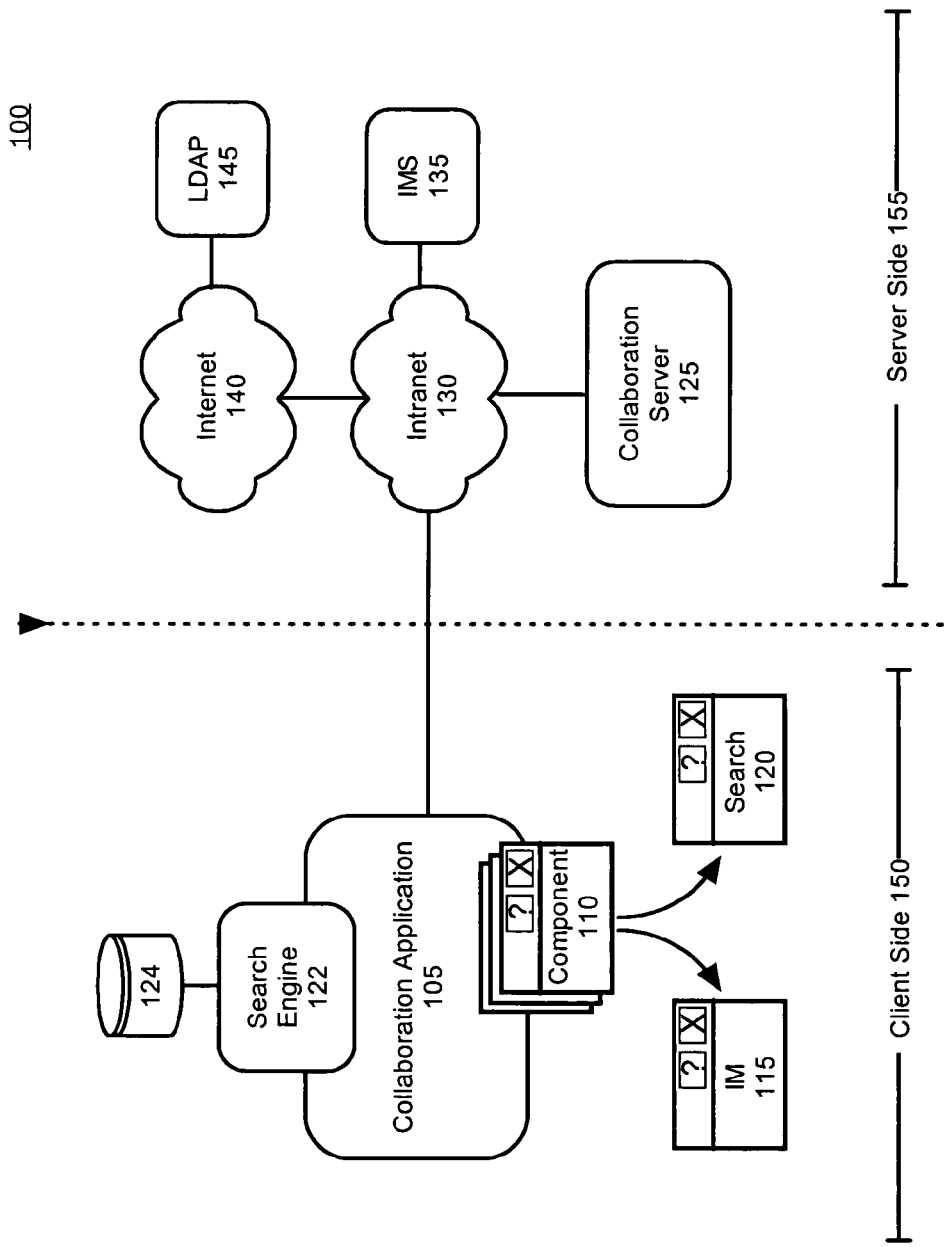
FIG. 1 is a schematic diagram illustrating a system for software-enhanced communication with presence awareness of online entities in accordance with the inventive arrangements disclosed herein.

FIG. 1 is a schematic diagram illustrating a system 100 for software-enhanced communication with presence awareness of online entities in accordance with the inventive arrangements disclosed herein. Software-enhanced communication can be any communication between geographically disperse individuals involving collaboration software and hardware. Geographically disperse individuals can include individuals located in different rooms of the same building as well as individuals located in a different cities. Software-enhanced communication can include Web conferencing, video and telephony teleconferencing, instant messaging, chatting, co-browsing, and the like. Presence awareness can refer to the capability of detecting online entities having a point of presence on a network. Online entities can include a user and/or group that is presently logged onto a collaboration software application and is capable of participating in a real-time software-enhanced communication session. Collaboration software can include any software application or series of applications for establishing software-enhanced communications among users on a network.

The system 100 can include a collaboration server 125 and a collaboration application 105. The collaboration server 125 can centrally manage aspects of a system that includes collaboration software. The collaboration server 125 can initialize communication channels necessary for establishing communications between parties, thereby functioning as a switchboard for software-enhanced communication sessions. Additionally, the collaboration server 125 can handle at least a portion of the computing overhead that exists during a communication session. For example, the collaboration server 125 can allocate a memory space needed for multiparty communication sessions, such as teleconferencing sessions, chat sessions, co-browsing, and Web broadcasts. The collaboration server 125 can also handle security, protocol and/or hardware translations, and administrative functions for system 100.

Further, multiple collaboration servers 125 can interoperate with each other within the system 100. When multiple collaboration servers 125 exist, the multiple collaboration servers 125 can be synchronized to one another, permitting each collaboration server 125 to handle localized software-enhanced communication tasks. For example, a multitude of intranets, such as intranet 130, can each include a dedicated collaboration server that performs intranet specific communication tasks.

The collaboration application 105 can be a client side 150 software application utilized by authorized end users for software-enhanced communications. The collaboration application 105 can include one or more component graphical user interfaces (GUIs) 110, a search engine 122, and a local data store 124. Each component GUI 110 can be an interface for a particular aspect of the collaboration application 105.

For example, the component GUIs 110 can include an instant messaging GUI 115 and a search GUI 120. The instant messaging GUI 115 can permit users to register themselves with the collaboration server 125 as instant messaging recipients. The instant messaging GUI 115 can also display a list of online entities that are registered with the collaboration server 125. Additionally, the instant messaging GUI 115 can include options for initializing the search GUI 120. The search GUI 120 can be an interface that provides a user with access to the functionality of the search engine 122.

According to one embodiment, the GUI 110 can be incorporated within a LOTUS SAMETIME™ type application. The LOTUS SAMETIME™ type application can include the LOTUS SAMETIME™ family of products and other applications with similar functionality that can integrate presence awareness capabilities into a collaboration software package.

In operation, the instant messaging GUI 115 can be displayed to an authorized user. The user can initialize an online entity search from within the GUI 115, thereby initializing search GUI 120. The user can then input a search pattern into search GUI 120 and conduct a search based upon the search pattern. The search parameters can search for online entities based upon any of variety of data fields specified in the search pattern, such as last name, first name, organization, title, project membership, and the like. This search can be performed by the search engine 122.

In one embodiment, multiple record sources can be accessed by the search engine 122 during the search. Record sources can include such sources as a local data store 124 that can contain personal contact information and other online entity related information, an organizational information management system 135, a directory assistance database 145, and the like. For example, the search engine 122 can search a point of presence database and correlate retrieved records with other databases. Further, an interface can be provided to permit an authorized user to configure the search engine 122 to search the multiple record sources in a particular order and/or manner.

The search performed by the search engine 122 can result in a list containing a set of online entities found to satisfy the search pattern. The list can be presented in the search GUI 120 or one of the other component GUIs 110. The user can select one or more online entities from the list and directly establish a software-enhanced communication with the selected entities.

In one embodiment, the search engine 122 can prevent particular users of the collaboration application 105 from receiving data concerning designated online entities, thereby protecting the privacy of the designated online entities. Specifically, customizable search limitations can be established for the search engine 122. The search limitations can limit the users permitted to search for a specified online entity to a select group. For example, search limitations can only permit users within a designated team or division to have awareness of an online entity. Search limitations can also block the awareness of designated online entities from designated users. For example, when an online entity does not want a select user to know of his or her presence online, the online entity can establish appropriate search limitations, thereby preventing the select user from receiving data relating to the online entity. Appreciably, the use of search limitations can permit online entities to be selectively unlisted in regards to the collaboration application 105.

It should be noted that the component GUIs 110 either can be integrated views within a common GUI or can be separately executable GUIs, each relating to a functionally distinct application. Accordingly, the collaboration application 105 can be a unified application for providing a suite of software enhanced communication routines, or can be a group of loosely coupled software applications, each performing a task related to software-enhanced communications.

It should also be noted that many different communication devices can be utilized to establish software enhanced communication within system 100. The communication devices can include Web enabled cellular telephones, notebook computers, personal data assistants, desktop computers, tablet PC's, personal communication devices, and the like.

Figure 2:
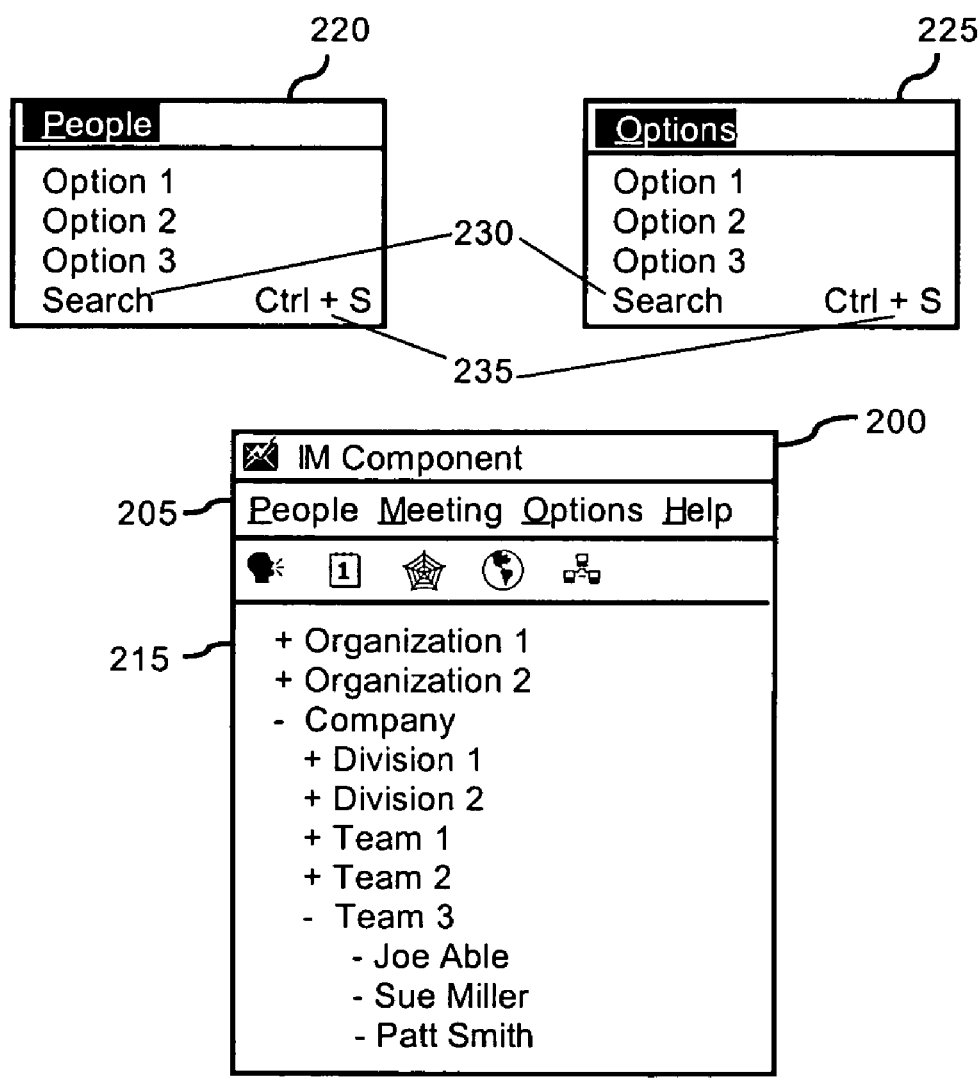
FIG. 2 illustrates an exemplary instant messaging graphical user interface (GUI) in accordance with the inventive arrangements disclosed herein.

FIG. 2 illustrates an exemplary instant messaging GUI 200 in accordance with the inventive arrangements disclosed herein. In a particular embodiment, the GUI 200 can represent the instant messaging GUI of a LOTUS SAMETIME™ type application. The GUI 200 can include an online entity section 215 and a menu bar 205. The online entity section 215 can display a list of users and/or groups that are presently online, which can collectively be referred to as online entities. Software enhanced communications, such as instant messaging, can be directly established with the online entities listed within the online entity section 215.

The menu bar 205 can include menus for accessing instant messaging options including, but not limited to, a people menu 220, a meeting menu, an options menu 225, and a help menu. In one embodiment, the people menu 220 can include a search 230 option. In another embodiment, the options menu 225 can include the search 230 option. The search option 230 can also be initiated using hot-key combination 235.

The search option 230 can initialize a means for searching the online entities of the online entity section 215. The searching means can utilize filters, ordering, and other techniques to help an authorized user locate a specified online entity. Additionally, the searching means can be interactively linked to the entity section 215 so that the entities presented in the entity section 215 are dynamically updated to reflect entities satisfying current search criteria.

Figure 3:
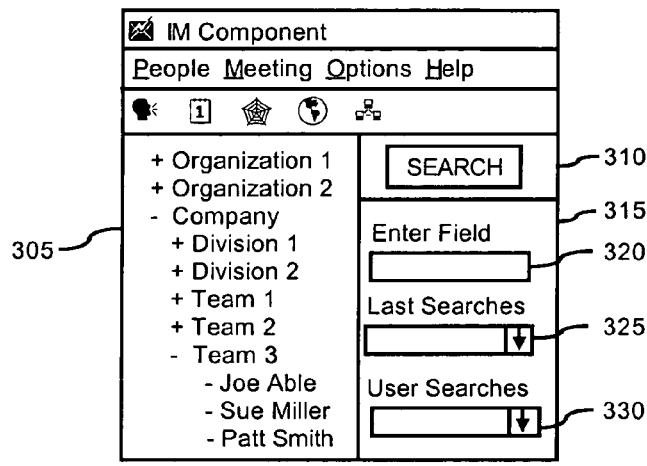
FIG. 3 illustrates another exemplary instant messaging GUI in accordance with the inventive arrangements disclosed herein.

FIG. 3 illustrates another exemplary instant messaging GUI 300 in accordance with the inventive arrangements disclosed herein. The GUI 300 can include an entity section 305 for displaying online entities and a search 315 section. The search section 315 can be used to help locate a user-specifiable entity from a set of available online entities.

The search section 315 can include a search button 310, an input field 320, a history field 325, and pattern retrieval field 330. The search button 310 can trigger a search based upon the inputted parameters of the search section 315. The entities listed within the entity section 305 can be updated responsive to the selection of search button 310. The input field 320 can permit the user of GUI 300 to specify the input parameters. The history field 325 can recall the last n searches performed within the GUI 300. The pattern retrieval field 330 can retrieve and enable previously recorded search patterns.

In one embodiment, a search recordation option (not shown) can be included in GUI 300 so that a search pattern specified within the input field 320 and/or the history field 325 can be recorded. When the search recordation option is selected, a user can input a search name, which can be used in the future to reference the recorded search. In a particular embodiment, a multitude of search names can appear within the pattern retrieval field 330. In another embodiment, an option can be provided within GUI 300 to edit previously recorded search patterns.

Figure 4:
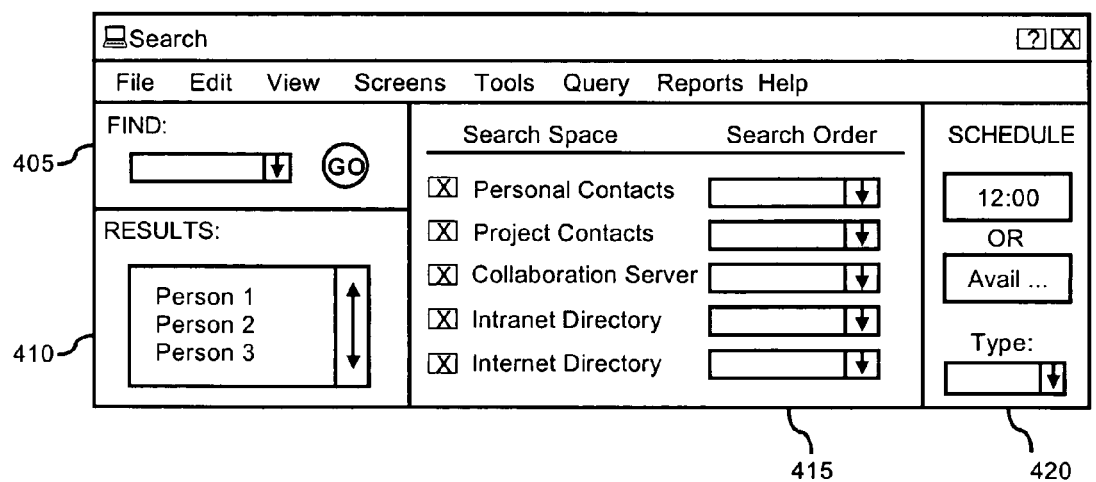
FIG. 4 illustrates yet another exemplary instant messaging GUI in accordance with the inventive arrangements disclosed herein.

FIG. 4 illustrates yet another exemplary instant messaging GUI 400 in accordance with the inventive arrangements disclosed herein. The GUI 400 can be dynamically linked to other GUIs of a collaboration software system so that activities performed within GUI 400 result in appropriate changes within the linked GUIs. GUI 400 can include a find section 405, a results section 410, a record source search section 415, and a schedule section 420.

The find section 405 can permit an authorized user to specify search parameters for online entities. The results section 410 can display the search results 410 for online entities satisfying the conditions of the search parameters. The record source search section 415 can be utilized to select which record searches are used within a search as well as the order in which multiple record sources are searched. The schedule section 420 can allow a user to automatically trigger a software-enhanced communication session whenever specified criteria are satisfied. The schedule section 420 can include input fields allowing any number of parameters to be specified for automatically initializing a communication session including, but not limited to, time parameters, availability parameters, session type, and the like. For example, the schedule section 420 can specify that a Web conference software-enhanced communication session is to be initialized whenever a particular entity is available online after a certain time.

It should be noted that the various GUIs disclosed herein are shown for purposes of illustration only. Accordingly, the present invention is not limited by the particular GUI or data entry mechanisms contained within views of the GUI. Rather, those skilled in the art will recognize that any of a variety of different GUI types and arrangements of data entry, fields, selectors, and controls can be used.

Figure 5:
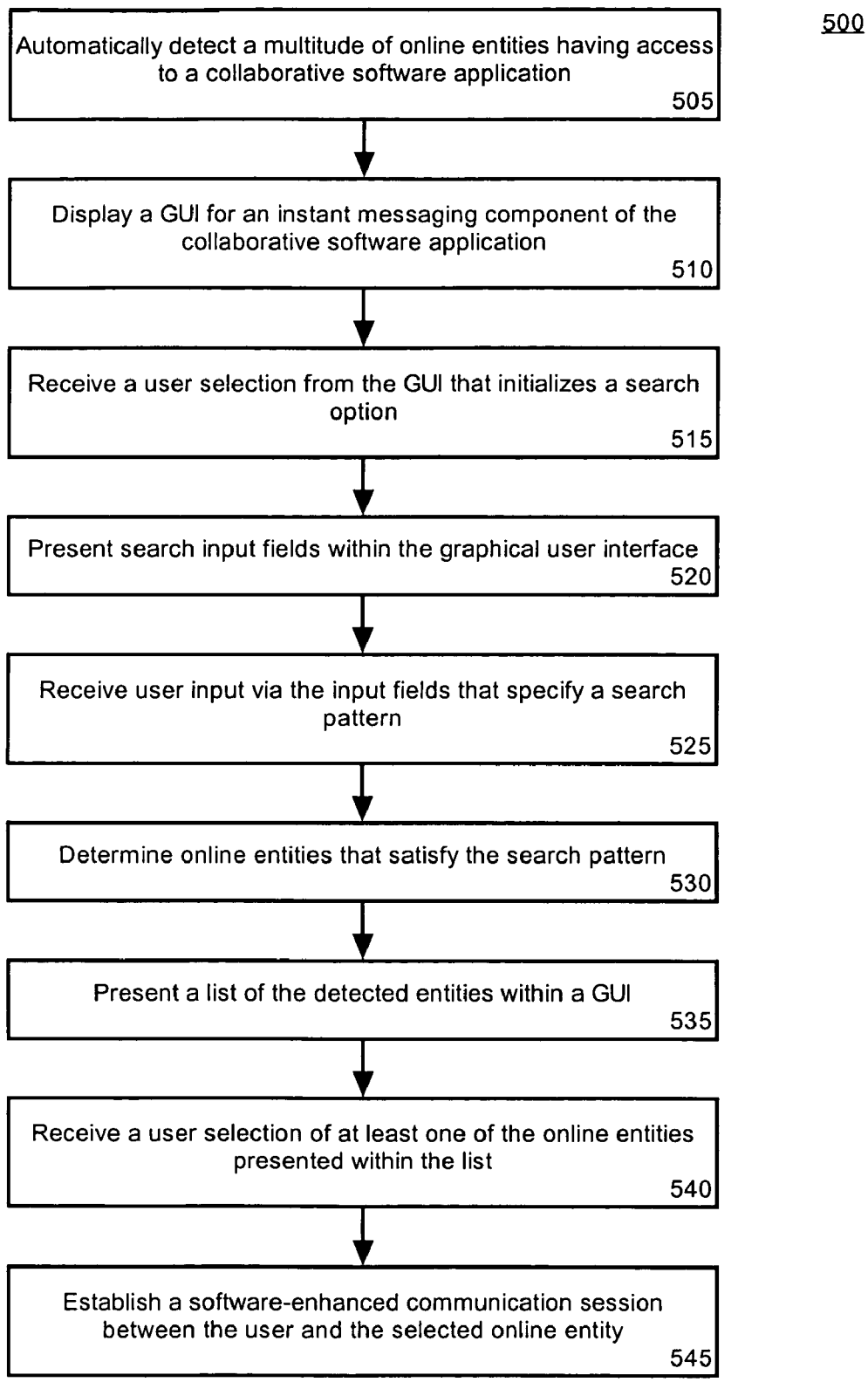
FIG. 5 is a flowchart illustrating a collaboration computing method in accordance with the inventive arrangements disclosed here.

FIG. 5 is a flowchart illustrating a collaboration computing method 500 in accordance with the inventive arrangements disclosed here. The method 500 can be performed in the context of a presence aware collaborative software system. The method can begin in step 505, where a multitude of online entities that are logged into the collaboration system can be automatically detected. In step 510, a GUI for an instant messenger component of the collaboration system can be displayed. A user can select a search option within the GUI. In step 515, responsive to the user selection a GUI for inputting search parameters can be initialized. In step 520, one or more search input fields can be presented within the GUI. The user can specify search criteria within these input fields, thereby specifying a search pattern. In step 525, a search engine within the collaboration system can receive the search pattern.

In step 530, the search pattern can be applied to one or more predefined record stores. For example, the search pattern can first utilize a local data store to determine whether any contacts within a contact management record store are satisfied. If no matching entities are found, other record stores, such as a directory assistance database, can be searched. In step 535, a list of the detected online entities satisfying the search pattern can be presented. The user can select one or more of the online entities from the list. In step 540, the user selection of online entities can be received. In step 545, a software-enhanced communication can be established between the user and the selected online entity and/or entities.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A collaborative computing method comprising the steps of:
   providing a collaborative computing system comprising at least one instant messaging client, the collaborative computing system including presence awareness features that automatically detect online entities that are logged into the collaborative computing system;
   initializing said instant messaging client within a graphical user interface of said collaborative computing system;
   displaying within the graphical user interface an availability list consisting of the detected online entities;
   establishing at least one customizable search limitation for a search engine, said search limitation preventing users other than users belonging to a predetermined class of users from accessing data records pertaining to one or more predetermined online entities and preventing selected users from receiving data indicating an online presence of one or more predetermined online entities;

receiving a search initializing action from said graphical user interface;

responsive to said receiving step, presenting a search view having search input fields within said graphical user interface;

receiving input via said input fields that specifies a customized search pattern;

subject to said at least one search limitation, searching by the search engine at least one record source of the online entities in the availability list for online entities that satisfy said customized search pattern using the presence awareness features;

displaying a search result from said searching step within said graphical user interface;

selecting at least one of the online entities displayed in the search result; and establishing a software-enhanced communication including at least one communication other than instant messaging related communications between a user of the instant messaging client and the selected online entity.

2. The method of claim 1, wherein said search initializing action comprises at most two user inputs.

3. The method of claim 2, further comprising the step of:
displaying a menu option within said graphical user interface for said instant messaging client, wherein said menu option is configured to initiate said search view.

4. The method of claim 2, further comprising the step of:
providing a keyboard combination to initiate said search view, whereby said keyboard combination is a hot-key combination.

5. The method of claim 1, further comprising the step of:
specifying a plurality of record sources, each of which specifies at least one online entity, wherein said searching step further comprises searching said plurality of record sources for online entities that satisfy said search pattern.

6. The method of claim 5, further comprising the steps of:
establishing at least one search preference that is used when performing said searching step, wherein said search result is based at least in part upon said search preference.

7. The method of claim 5, further comprising the step of:
establishing an order in which said record sources are accessed during said searching step.

8. The method of claim 1, further comprising the steps of:
establishing a plurality of user specific search patterns; and
recording said search patterns so that said search patterns can be retrieved at a later time.

9. The method of claim 1, wherein said record source comprises a first database that is a record source specifying at least one online entity and a second database having a data field, wherein said data field specifies an attribute relating to said online entity that is not specified within said first database, said searching step further comprising the steps of:
establishing a query that includes said data field; and
searching for at least one online entity using said query.

10. The method of claim 1, further comprising the step of:
directly executing at least one software-enhanced communication involving said online entity and a user of said graphical user interface using said search result.

11. A collaborative computing system comprising:
means for automatically detecting online entities that are logged into the collaborative computing system;
at least one instant messaging client;

means for initializing the instant messaging client within a graphical user interface of the collaborative computing system;

means for displaying within the graphical user interface an availability list consisting of the detected online entities;

means for establishing at least one customizable search limitation for a search engine, said search limitation preventing users other than users belonging to a predetermined class of users from accessing data records pertaining to one or more predetermined online entities and preventing selected users from receiving data indicating an online presence of one or more predetermined online entities;

means for receiving a search initializing action from the graphical user interface;

means for, responsive to the receiving step, presenting a search view having search input fields within the graphical user interface;

means for receiving input via the input fields that specifies a customized search pattern;

means for, subject to the at least one search limitation, searching by the search engine at least one record source of the online entities in the availability list for online entities that satisfy the customized search pattern;

means for displaying a search result from the searching step within the graphical user interface;

means for selecting at least one of the online entities displayed in the search result; and means for establishing a software-enhanced communication including at least one communication other than instant messaging related communications between a user of the instant messaging client and the selected online entity.

12. A machine-readable storage having stored thereon, a computer program having a plurality of code sections, said code sections executable by a machine for causing the machine to perform the steps of:
providing a collaborative computing system comprising at least one instant messaging client, the collaborative computing system including presence awareness features that automatically detect online entities that are logged into the collaborative computing system;

initializing said instant messaging client within a graphical user interface of said collaborative computing system;

displaying within the graphical user interface an availability list consisting of the detected online entities;

establishing at least one customizable search limitation for a search engine, said search limitation preventing users other than users belonging to a predetermined class of users from accessing data records pertaining to one or more predetermined online entities and preventing selected users from receiving data indicating an online presence of one or more predetermined online entities;

receiving a search initializing action from said graphical user interface;

responsive to said receiving step, presenting a search view having search input fields within said graphical user interface;

receiving input via said input fields that specifies a customized search pattern;

subject to said at least one search limitation, searching by the search engine at least one record source of the online entities in the availability list for online entities that satisfy said customized search pattern using the presence awareness features;

displaying a search result from said searching step within said graphical user interface;

selecting at least one of the online entities displayed in the search result; and establishing a software-enhanced communication including at least one communication other than instant messaging related communications between a user of the instant messaging client and the selected online entity.

* * * * *

UNITED STATES PATENT AND TRADEMARK OFFICE
CERTIFICATE OF CORRECTION

PATENT NO.      : 7,647,378 B2          Page 1 of 1
APPLICATION NO. : 10/715313
DATED           : January 12, 2010
INVENTOR(S)     : Keith A. Thuerk It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1182 days.

Signed and Sealed this

Sixteenth Day of November, 2010

David J. Kappos
*Director of the United States Patent and Trademark Office*